United States Patent [19]

Sasaki et al.

[11] Patent Number: 4,874,658

[45] Date of Patent: Oct. 17, 1989

[54] SYNTHETIC FILAMENT-REINFORCED POLYMER MATERIAL SHEET AND PROCESS FOR PRODUCING THE SAME

[75] Inventors: Yoshiyuki Sasaki, Takatsuki; Tetsuo Okamoto, Ibaraki, both of Japan

[73] Assignee: Teijin Limited, Osaka, Japan

[21] Appl. No.: 95,342

[22] Filed: Sep. 10, 1987

[30] Foreign Application Priority Data

Sep. 11, 1986 [JP] Japan .................................. 61-212780

[51] Int. Cl.$^4$ ......................... B32B 27/04; D04H 1/06
[52] U.S. Cl. .................................... 428/220; 428/294; 428/295; 428/910
[58] Field of Search ................ 428/294, 295, 910, 220

[56] References Cited

U.S. PATENT DOCUMENTS

| | | |
|---|---|---|
| 3,180,003 | 4/1965 | Lamb . |
| 3,255,875 | 6/1966 | Tierney .............................. 428/294 |
| 3,391,050 | 7/1968 | Nebesar . |
| 3,472,730 | 10/1969 | Firigstad ............................ 428/295 |
| 3,505,155 | 4/1970 | Balch et al. . |
| 4,216,856 | 8/1980 | Moring et al. ...................... 428/295 |
| 4,612,241 | 9/1986 | Howard, Jr. ........................ 428/294 |

FOREIGN PATENT DOCUMENTS 0167303 1/1986 European Pat. Off. .
1629830 1/1971 Fed. Rep. of Germany .

Primary Examiner—Marion C. McCamish
Assistant Examiner—Nizar M. Ibrahim
Attorney, Agent, or Firm—Burgess, Ryan and Wayne

[57] ABSTRACT

A synthetic filament-reinforced polymer material sheet having a very small thickness of 0.25 mm or less and a large specific tensile strength of $3.4 \times 10^6$ cm or more is composed of a reinforcing sheet in which a number of straightened individual synthetic polymer filaments are arranged in parallel to each other and are spaced from each other at an average interval not larger than the average thickness of the filaments, and which has a width W anmd a thickness T satisfying the relationship $W/T \geq 40$ and a coefficient of variation of thickness of 30% or less, and a polymer material impregnated in the spaces between the individual filaments.

7 Claims, 4 Drawing Sheets

SYNTHETIC FILAMENT-REINFORCED POLYMER MATERIAL SHEET AND PROCESS FOR PRODUCING THE SAME

BACKGROUND OF THE INVENTION

1. Field of the Invention

The present invention relates to a synthetic filament-reinforced polymer material sheet and a process for producing the same. More particularly, the present invention relates to a very thin synthetic filament reinforced polymer material sheet having a very small thickness and an enhanced tensile strength and a process for producing the same with a high productivity.

2. Description of the Related Art

It is well known that steel sheets are useful as a reinforcing material and a packing or crating material. However, the steel sheets are disadvantageous in having a relatively large thickness and weight. Recently, a new material having a reduced thickness and weight and useful, in place of the steel sheet, as a reinforcing material and a packing material has been sought.

For example, to meet these requirements, various types of light sheet materials comprising a core consisting of a fiber web, for example, a woven fabric, and impregnated with a polymer material have been disclosed. However, these conventional fiber web-reinforced polymer material sheets are disadvantageous in that they have an unsatisfactory mechanical strength and a larger thickness than that of the conventional steel sheet.

For example, in a conventional reinforcing sheet consisting of a woven fabric, a number of warp yarns intersect a number of weft yarns so that they are curved around each other in a zigzag form, and each of the warp and weft yarns consists of a large number of individual filaments which are twisted and are in contact with each other.

Accordingly, when the woven fabric is stretched in a direction in parallel to or at right angles to the longitudinal axis of the woven fabric, a tensile force is applied to each of the individual filaments in the warp yarns or weft yarns at inclined angles from the longitudinal axis of the filament. Thus, the tensile strength of each individual filament cannot be completly utilized for the tensile force.

Also, in the woven fabric, the individual filaments are usually in contact with each other. Therefore, it is difficult for the polymer material to evenly penetrate the spaces formed among the individual filaments and to be evenly distributed in the woven fabric. This difficulty causes the resultant reinforced sheet to exhibit an unsatisfactory mechanical strength.

Furthermore, in the woven fabric, the polymer material penetrates mainly into large spaces formed among the warp and weft yarns. This phenomenon causes the polymer material to be unevenly distributed in the woven fabric and the resultant woven fabric-reinforced sheet to exhibit an unsatisfactory mechanical strength.

Still further, the conventional woven fabric is not satisfactory when attempting to provide a very thin reinforced polymer material sheet having a thickness of, for example, 0.25 mm or less.

Additionally, when the conventional woven fabric is used as a reinforcing sheet, the resultant reinforced polymer material sheet has rough surfaces thereof and thus exhibits an unsatisfactory smoothness and evenness.

Another conventional reinforcing sheet consists of a number of multifilament yarns each consisting of a number of individual filaments. The multifilament yarns are arranged in parallel to each other, do not intersect each other, and have straight individual filaments.

Accordingly, the multifilament yarn reinforcing sheet is useful for producing a reinforced polymer material sheet having a higher mechanical strength and a smaller thickness than those of the above-mentioned conventional woven fabric-reinforced polymer material sheet.

However, the individual filaments are bundled in each yarn and are in contact with each other.

Therefore, when impregnated by a polymer material, the polymer material mainly penetrates into the spaces formed between the yarns and it is difficult for the polymer material to penetrate between the individual filaments. Thus, the polymer material is unevenly distributed in the reinforcing sheet and some of the spaces between the individual filaments are not filled by the polymer material. Thus the resultant multifilament yarn-reinforced sheet exhibits an unsatisfactory mechanical strength, is easily split along the spaces not filled by the polymer material, and has poor durability in use.

Also, since the individual filaments in each yarn are bundled but not opened, it is difficult to provide a very thin multifilament yarn-reinforced polymer material sheet having a thickness of, for example, 0.25 mm or less, unless very thin multifilament yarns are used. Note, very thin multifilament yarns are very expensive. Additionally, the multifilament yarn-reinforced polymer material sheet has rough surfaces and exhibits an unsatisfactory smoothness and evenness.

Accordingly, the conventional fiber web-reinforced or multifilament yarn-reinforced polymer material sheets are not always usable in place of the steel sheet.

Attempts have been made to use other sheets, for example, light metal sheets such as Duralumin sheets and synthetic polymer sheets, in place of the steel sheets. However, these sheets are disadvantageous in that they have a large thickness and/or low mechanical strength and durability in use, and therefore, the attempt has not always been successful.

SUMMARY OF THE INVENTION

An object of the present invention is to provide a synthetic filament-reinforced polymer material sheet having a smaller thickness and weight and a higher mechanical strength and durability in use than those of conventional steel sheets and a process for producing the same.

The above-mentioned object can be attained by the synthetic filament-reinforced polymer material sheet of the present invention, which has a thickness of 0.25 mm or less and a specific tensile strength of $3.4 \times 10^6$ cm or more and comprises: a reinforcing sheet comprising a number of individual synthetic polymer filaments straightened and arranged substantially in parallel to each other and spaced from each other at an average interval equal to or smaller than the average thickness of the individual filaments and having a width W and a thickness T thereof satisfying the relationship:

$$W/T \geq 40$$

and a coefficient of variation of the thickness thereof of 30% or less, and a polymer material impregnated in the reinforcing sheet to fill up the spaces among the individual filaments.

The above-mentioned synthetic filament-reinforced polymer material sheet can be produced by the process of the present invention, which comprises the steps of: arranging a number of individual synthetic polymer filaments substantially in parallel to each other; crimping the individual filaments in such a manner that the individual filaments are fed between a pair of rotating crimping gears, one of which has sharp edges and the other has rounded edges, and which are rotating at a larger periphery speed than the feed speed of the individual filaments, are brought into contact with the sharp edges and the rounded edges alternately arranged, are bent by the sharp edge under tension, and then are released from the tension, to allow the individual filaments to be crimped and bulked; applying a tension to the crimped individual filaments to an extent such that the crimped individual filaments are straightened and are spaced from each other at an average interval equal to or smaller than the average thickness of the individual filaments, to provide a reinforcing sheet consisting of the resultant straightened and opened individual filaments satisfying the relationship:

$$W/T \geq 40$$

wherein W and T respectively represent a width and a thickness of the reinforcing sheet and having a coefficient of variation of thickness thereof of 30% or less; and impregnating the reinforcing sheet with a polymer material to fill up the spaces among the individual filaments therein.

DESCRIPTION OF THE PREFERRED EMBODIMENTS

Figure 1:
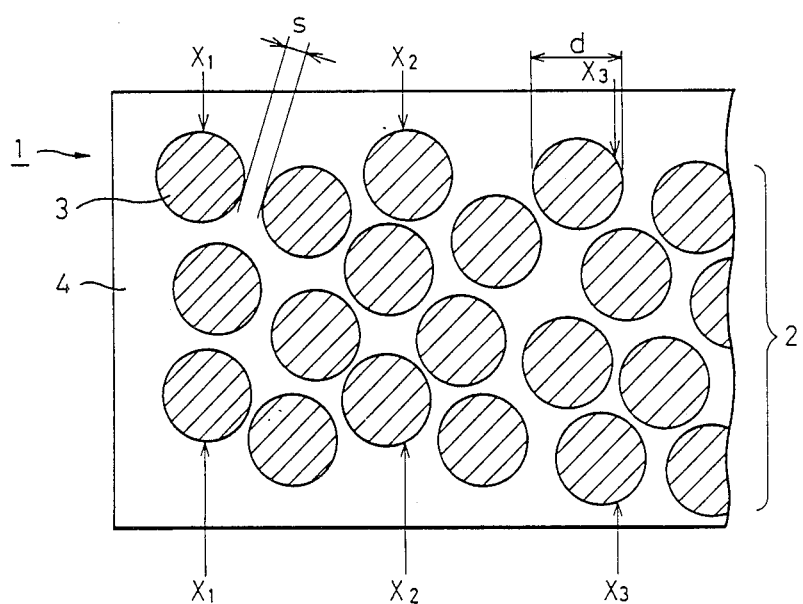
FIG. 1 shows a cross-section of a portion of a synthetic filament-reinforced polymer material sheet of the present invention.

The synthetic filament-reinforced polymer material sheet of the present invention comprises a specific reinforcing sheet comprising a number of individual synthetic filaments and a polymer material with which the reinforcing sheet is impregnated.

The individual synthetic filaments comprise a synthetic fiber-forming polymer and preferably have a high degree of crystalline orientation of 90% or more, more preferably 95% or more, and a high degree of crystallization of 65% or more, more preferably 80% or more.

If the individual synthetic filaments have a low degree of crystalline orientation and/or a low degree of crystallization, the resultant reinforcing sheet sometimes does not provide a satisfactory synthetic filament-reinforced polymer material sheet having all of a very smaller thickness and weight and a higher mechanical strength than those of the conventional steel sheets.

The synthetic filaments usable for the present invention are preferably selected from wholly aromatic polyamide filaments, for example, filaments comprising a poly-p-phenylene terephthalamide or modified wholly aromatic polyamide filaments, wholly aromatic polyester filaments, for example, polyoxybenzol filaments, and high orientation polyethylene filaments.

More preferably, the synthetic filaments used for the present invention comprise a poly-p-phenylene terephthalamide or a modified polymer thereof. The modified wholly aromatic polyamide filament is, for example, composed of a filamentary core consisting of a wholly aromatic polyamide and a coating layer formed on the filamentary core surface and consisting of a wholly aromatic polyamide having at least one pendant amino radical attached to at least 10% of the recurring units of the polyamide molecule.

The high orientation, high crystallization polymer filaments can be readily crimped and opened by the specific crimping procedure in the process of the present invention in which the filaments are bent by a sharp edge under tension.

Ordinary polyester and polyamide filaments, which are cheaper and thus economically more advantageous than the above-mentioned high orientation, high crystallization polymer filaments, can be used for the present invention as long as they have satisfactorily high degrees of crystalline orientation and crystallization.

In a process for producing the high orientation high crystallization polyester and polyamide filaments comprising a melt-spinning operation and drawing operation, preferably the drawing operation is carried out in an increased number of steps, for example, two steps or more, at an increased draw ratio of, for example, 5 or more.

The individual synthetic filaments usable for the present invention are not restricted to those having a specific thickness.

However, preferably they have a thickness of 0.8 to 6 denier, more preferably 1 to 20 denier, and are usually supplied in the form of a multifilament yarn or tow having a thickness of 1,000 to 30,000 denier, more preferably 1,500 to 15,000 denier.

In the reinforcing sheet of the present invention, a large number of the individual filaments are straightened and arranged substantially in parallel to each other along the longitudinal axis of the sheet and spaced from each other at an average interval equal to or smaller than the average thickness of the individual filaments.

Referring to FIG. 1, which shows a cross-section of a filament reinforced polymer material sheet 1, a reinforcing sheet 2 consisting of a number of individual filaments 3 is embedded in a polymer material matrix 4. The individual filaments having a thickness (diameter) d are separated from each other at intervals s. The average value of the interval s is equal to or smaller than the average thickness of the individual filaments.

The straightened individual filaments are evenly distributed in an appropriate distribution density in the reinforcing sheet and form spaces evenly distributed in the reinforcing sheet. Thus, when the polymer material is filled in the spaces in the reinforcing sheet, the individual filaments and the polymer material can be evenly distributed in the resultant filament-reinforced polymer material sheet.

Also, the reinforcing sheet should have a width W and a thickness T satisfying the relationship:

$$W/\sqrt{T} \geqq 40$$

preferably $$W/\sqrt{T} \geqq 100.$$

Furthermore, the reinforcing sheet must have a very high evenness in the thickness thereof, that is, a coefficient of variation of thickness of 30% or less, preferably 18% or less. The term "coefficient of variation of thickness" will be explained in detail hereinafter.

The above-mentioned features of the reinforcing sheet are very important for allowing the resultant polymer material sheet to have the individual filaments spaced from each other and evenly distributed therein and the polymer material evenly distributed in the reinforcing sheet and to exhibit an enhanced mechanical strength and evenness. If the individual filaments are curled or bent, are interlaced or intersected with each other, and/or are in contact with each other and/or the thickness of the reinforcing sheet is uneven, the resultant filament-reinforced polymer material sheet cannot exhibit a satisfactorily high and uniform mechanical strength.

In the filament-reinforced polymer material sheet, the reinforcing sheet is impregnated with a polymer material to fill the spaces among the evenly distributed individual filaments.

The type of polymer material to be used is selected in consideraion of the necessary bonding property of the polymer material to the individual filaments used, the necessary dimensional stability and form-stability after solidification of the resultant filament-reinforced polymer material sheet, and, optionally, the necessary thermal stability, chemical resistance, electric insulating property, and other chemical and physical properties of the filament-reinforced polymer material sheet.

Since the individual filaments are straightened, are spaced from each other, and are distributed in an appropriate distribution density in the reinforcing sheet, a polymer material having a relatively low penetration property can be utilized for the present invention as long as the polymer material is satisfactory in other necessary properties.

The polymer material is preferably selected from thermosetting resins, for example, epoxy resins, phenolic compound-formaldehyde resins, (for example, phenol-formaldehyde resins and cresol-formaldehyde resins), unsaturated polyester resins (for example, alkyd resins), diallyl phthalate resins, bi-maleimide resins, triazine resins, and silicone resins (for example, polydimethylsiloxane resins); and thermoplastic resins, for example, polybutylene terephthalate resins, saturated polyester resins (for example, polyethylene terephthalate resins), polyacetal resins (for example, polyoxymethylene resins), polycarbonate resins, aliphatic polyamide (nylon) resins (for example, nylon 12, nylon 46, nylon 6, and nylon 66), modified polyphenyleneoxide resins, polysulfon resins, polyethersulfon resins, polyphenylenesulfide resins, polyallylate resins, polyamideimide resins, polyetherimide resins, and polyetheretherketone resins. Some of the above-mentioned resins have a relatively high melt viscosity and thus exhibit a relatively low penetration property. They, however, can be advantageously utilized for the present invention because they can easily penetrate the spaces formed among the straightened individual filaments.

Further, the polymer material can be selected from non-thermoplastic polymer resins, for example, polyimide resins, polyoxybenzoate resins, and fluorine-containing polymer resins as long as they can be applied in a mobile state to the reinforcing sheet.

In the filament-reinforced polymer material sheet of the present invention, the reinforcing sheet of polymer filaments and the polymer material can be used in any weight ratio in consideration of the usage and necessary properties and functions of the resultant filament-reinforced polymer material sheet. Preferably, the weight ratio of the reinforcing sheet to the polymer material is in a range of from 70:30 to 20:80, more preferably 70:30 to 40:60.

Since the individual filaments are spaced from each other at appropriate intervals, the polymer materials can uniformly bond the individual filaments to each other, in a relatively small amount, so as to increase the content of the individual filaments in the resultant filament-reinforced polymer material sheet. Especially, where the content of the individual filaments is 40% or more, the resultant filament-reinforced polymer material sheet exhibits an excellent mechanical strength which could not be attained by the conventional filament-reinforced polymer material sheets.

In the filament-reinforced polymer material sheet of the present invention, preferably the spaces among the individual filaments are filled at a filling (packing) percentage of 60, more preferably 80 or more, still more preferably 90 or more, with the polymer material. If the filling percentage of the spaces with the polymer material is less than 60, the resultant filament-reinforced polymer material sheet may exhibit an unsatisfactory mechanical strength and evenness.

Also, since the individual filaments are evenly opened to an extent such that the resultant reinforcing sheet has a width which corresponds to 40 times or more, preferably 100 times or more, of the thickness thereof, and the individual filaments are spaced from each other, the resultant reinforcing sheet does not contain a portion thereof in which the individual filaments are in contact with each other and are distributed in a high distribution density and thus has an even thickness thereof.

In comparison, in ordinary woven fabrics or multifilament yarn sheets in which a number of multifilament yarns are arranged in parallel to each other, the individual filaments are locally distributed in a high distribution density in the fabric or sheet, and thus, the thickness of the fabrics or sheets has a low evenness.

Due to the specific features mentioned above, the resultant filament-reinforced polymer material sheet of the present invention can exhibit a uniform and excellent mechanical strength even if the thickness thereof is very small. That is, the filament-reinforced polymer material sheet of the present invention has both a very small thickness of 0.25 mm or less and a very high specific tensile strength of $3.4 \times 10^6$ cm or more.

The term "a specific tensile strength of a sheet" refers to a quotient in the unit of cm, of the tensile strength in the unit of g/cm² by the specific gravity in the unit of g/cm³, of the sheet.

A coefficient of variation (CV) of thickness of a reinforcing sheet is determined by the following method.

A cross-section of a filament-reinforced polymer material sheet is observed by a microscope, as shown in FIG. 1.

On the cross-section as shown in FIG. 1, a filament-reinforced polymer material sheet 1 comprises a reinforcing sheet 2 consisting of a number of individual filaments 3 spaced from each other and impregnated with a polymer material 4.

On the cross-section, thicknesses $X_1, X_2, X_3 \ldots$ of the reinforcing sheet 2 are measured at n points, for example, 100 points, at intervals of 0.1 mm.

The standard deviation ($\sigma$) of the measured values X of the thickness is calculated in accordance with the equation:

$$\sigma = \sqrt{\Sigma (X - \overline{X})^2/n - 1}$$

wherein $\overline{X}$ represents an average of the measured values X of the thickness.

The coefficient of variation (CV) of the thickness of the reinforcing sheet is calculated in accordance with the equation:

$$CV (\%) = \sigma/\overline{X} \times 100$$

The filament-reinforced polymer material sheet as mentioned above can be produced by the process of the present invention.

Figure 2:
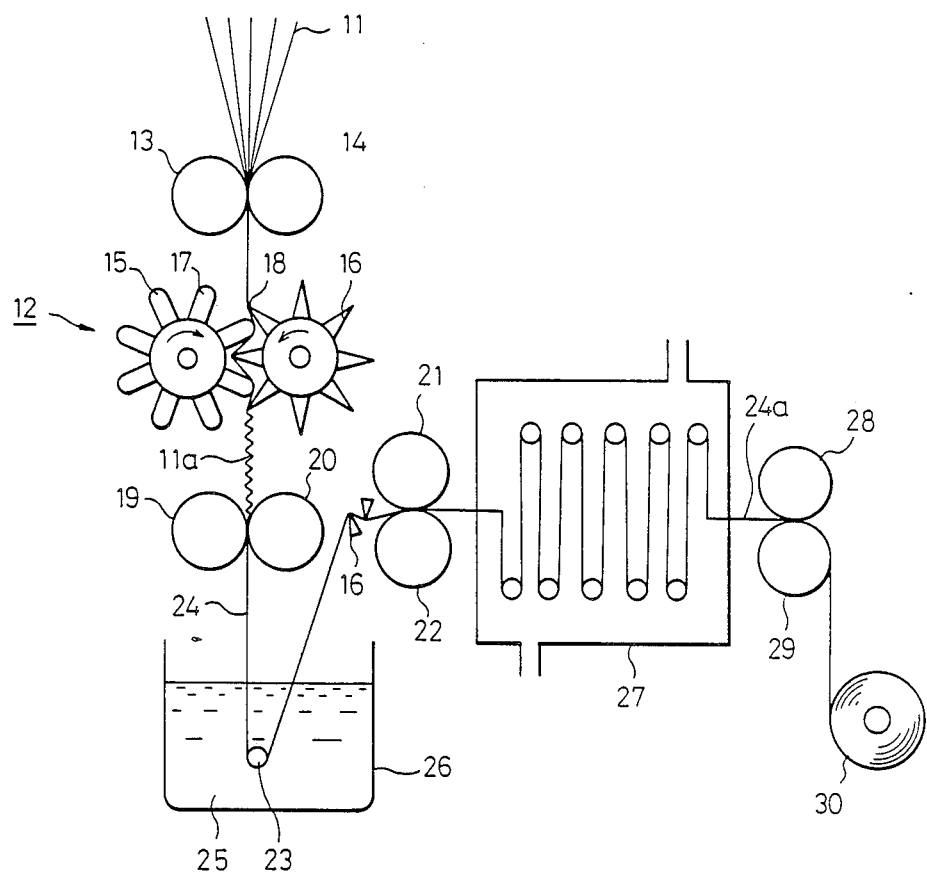
FIG. 2 is an explanatory diagram of a process of the present invention.

Referring to FIG. 2, a number of individual synthetic polymer filaments 11 are arranged substantially in parallel to each other into a thin sheet-like form and then fed into a crimping machine 12 through a pair of feeding rollers 13 and 14. The crimping machine 12 comprises a pair of crimping gears 15 and 16 rotating at the same speed in the directions as shown by the arrows. The crimping gear 15 has a plurality of rounded edges 17 and the crimping gear 16 has a plurality of sharp edges 18. The peripheral speeds of the rounded edge gear 15 and the sharp edge gear 16 are higher than the feed speed of the individual filaments. Accordingly, when the individual filaments 11 come into contact with the round edges 17 and the sharp edges 18, the peripheral surfaces of the individual filaments introduced into the crimping machine 12 are rubbed by the sharp edges 18 and the rounded edges 17 of the crimping gears 15 and 16, and a tension is generated on the individual filaments. The friction generated on the individual filament surfaces by the sharp edges 18 is significantly larger than that generated by the round edges 17, and the individual filaments are bent at smaller angles by the sharp edges than be the round edges.

Figure 3:
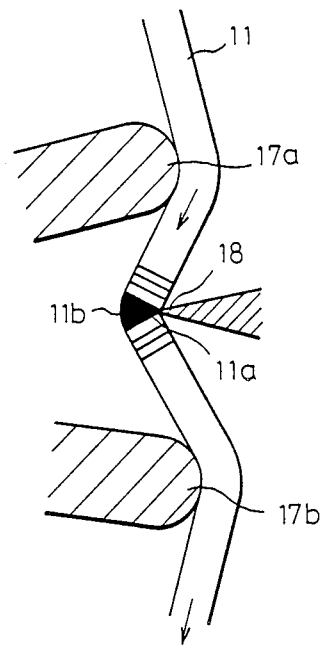
FIG. 3 is a side view of an individual filament crimped by the process of the present invention.

Referring to FIG. 3, an individual filament 11 is bent by a sharp edge 18 between the rounded edges 17a and 17b. That is, the individual filament 11 is gradually curved at a large angle around the rounded end of the edge 17a and then quickly and sharply bent by the sharp point of the edge 18. The portion 11a of the individual filament in contact with the sharp edge 18 is rapidly compressed while being rubbed by the point of the sharp edge 18 and the other portion 11b of the individual filament 11 located at the side opposite to the compressed portion 11a is rapidly expanded to an extent larger than an elastic limit of the individual filament 11, to create a latent crimp on the filament 11. Then, the bent individual filament 11 is gradually curved around the rounded edge 17b in a direction opposite to the bending direction. This curving does not cause the latent crimp on the filament to be removed.

Figure 4:
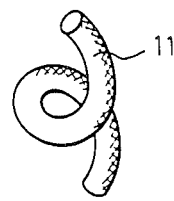
FIG. 4 shows a portion of an individual filament crimped by the process of the present invention.

Referring to FIG. 2, when the individual filaments have passed through the crimping machine 12, the tension is released from the filaments so as to allow the latent crimps on the individual filaments to appear, as shown in FIG. 4.

Figure 5:
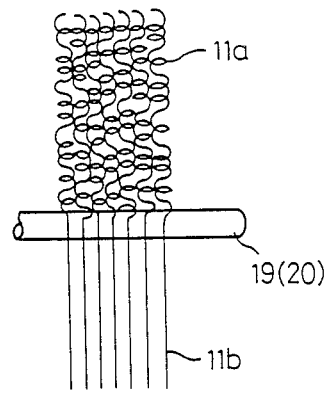
FIG. 5 shows a change of crimped individual filaments to straightened individual filaments under tension.

After the tension is released, the individual filaments 11 become crimped filaments 11a which may be in contact with each other as shown in FIG. 5.

Referring to FIG. 2, tension is applied to the crimped individual filaments 11a between a pair of nip rollers 19 and 20 and a pair of withdrawing rollers 21 and 22 through a guide roller 23.

Referring to FIG. 5, after passing through the pair of feed rollers 19 and 20, the individual filaments are stretched and straightened under tension to form straightened individual filaments 11b spaced from each other.

In the above-mentioned procedures, the crimping procedures are effective not only for imparting crimps to the individual filaments but also for opening the individual filaments into a thin sheet form.

The tension releasing procedure is effective for converting the individual filaments to crimped and bulked individual filaments which may be in contact with each other.

The tension-applying procedure is effective for converting the crimped and bulked individual filaments to straightened individual filaments spaced from each other at an average interval equal to or smaller than the average thickness of the individual filaments.

The straightened and opened individual filaments form a reinforcing sheet satisfying the relationship:

$$W/T \geq 40$$

wherein W and T respectively represent a width and a thickness of the reinforcing sheet and having a coefficient of variation of the reinforcing sheet of 30% or less.

Referring to FIG. 2, the reinforcing sheet 24 fed through the feed rollers 19 and 20 is immersed in a liquid 25 containing a polymer material and contained in a vessel 26. The immersed reinforcing sheet 24 is withdrawn from the liquid 25 by the withdrawing rollers 22 and 21, through the guide roller 23. A pair of doctor knives 16 remove an excessive amount of the polymer material-containing liquid from the upper and lower surfaces of the reinforcing sheet 24.

Then, the reinforcing sheet 24 impregnated with the polymer material-containing liquid is introduced into a dryer 27 and dried therein. The resultant thin filament-reinforced polymer material sheet 24a, wherein the dried polymer material fills the spaced between the individual filaments, is delivered from the dryer 27 through a pair of delivery rollers 28 and 29 and then is wound up to form a roll 30.

The present invention will be illustrated in detail by the following examples and comparative examples.

EXAMPLE 1

A filament-reinforced polymer material sheet was prepared by using an apparatus as shown in FIG. 2.

Referring to FIG. 2, five non-twisted high orientation multifilament yarns consisting of a poly-p-phenylene- 3,4'-diphenylether terephthalamide (trademark: Technola, made by Teijin Ltd.) and each having a yarn count of 1500 denier/1000 filaments were arranged in parallel to each other and were fed at a feed speed of 10 m/min into a crimping machine 12 through a pair of feeding rollers 13 and 14.

In the crimping machine 12, a pair of crimping gears 15 and 16 were rotated at a peripheral speed of 90 m/min.

The resultant crimped filaments were delivered from the crimping machine 12 and fed to a pair of nip rollers 19 and 20. The peripheral speed of the nip rollers 19 and 20 was 3% less than the delivery speed of the crimping machine 12. Therefore, the individual filaments were relaxed so that crimps were generated on the individual filaments to cause the individual filaments to be bulked.

The crimped and bulked individual filaments were straightened under a tension between the nip rollers 19 and 20 and the withdrawing rollers 21 and 22 through the guide roller 23 to form a reinforcing sheet having a width of 15 mm, while being impregnated with a solution of an epoxy resin contained in the container 26. The peripheral speed of the withdrawing rollers 21 and 22 was 3% larger than that of the nip rollers 19 and 20.

The amount of the epoxy resin solution in the reinforcing sheet was adjusted to a level of 100% based on the weight of the reinforcing sheet by doctor knives 16.

The epoxy rein solution-impregnated sheet was dried and heated at a temperature of 150° C. for 2 minutes in the dryer 27.

The resultant filament-reinforced polymer material sheet was withdrawn from the dryer 27 by a pair of delivery rollers 28 and 29 and was wound to form a roll 30.

The filament-reinforced polymer material sheet had a width (W) of 15 mm, a thickness (T) of 0.08 mm, a ratio W/T of 188, a tensile strength of 127 kg/mm$^2$, a specific gravity of 1.25, and a specific tensile strength of $10.1 \times 10^6$ cm ($127/1.25 \times 10^5$). Also, it was found that, in the filament-reinforced polymer material sheet, an average thickness of the individual filaments was $1.24 \times 10^{-2}$ mm and an average interval between the individual filaments was $0.56 \times 10^{-2}$ mm. Further, it was found that the reinforcing sheet had a very small coefficient of variation (CV) of thickness of 6%.

That is, in the resultant filament-reinforced polymer material sheet, the individual filaments were evenly distributed at a relatively high density and the reinforcing sheet had an even thickness.

For comparison, a conventional reinforcing steel sheet and a conventional reinforcing super Duralumin sheet were produced by ordinary procedures.

The resultant comparative sheets had the properties as shown in Table 1.

TABLE 1

| | Tensile strength (kg/mm$^2$) | Specific gravity (g/cm$^3$) | Specific tensile strength ($\times 10^6$ cm) | Thickness (mm) |
|---|---|---|---|---|
| Example 1 | 127 | 1.25 | 10.1 | 0.08 |
| Steel sheet | 240 | 7.85 | 3.1 | 0.29 |
| Super Duralumin sheet | 46 | 2.80 | 1.6 | 0.50 |

Figure 6:
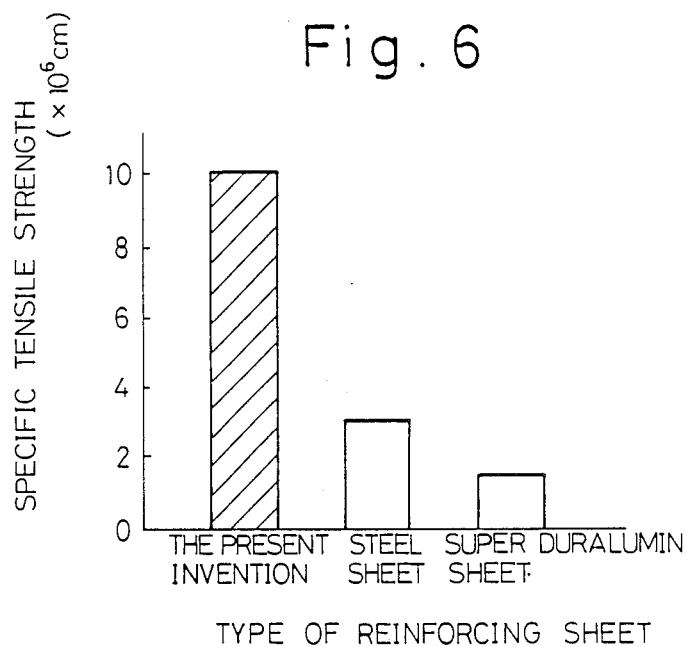
FIG. 6 shows specific tensile strengths of a synthetic filament-reinforced polymer material sheet of the present invention, a steel sheet, and a super Duralumin sheet.

Referring to FIG. 6, the resultant filament-reinforced polymer material sheet of the present invention had a much larger specific tensile strength than that of the conventional steel sheet-reinforced polymer material and of the conventional super Duralumin sheet-reinforced polymer material sheet.

Figure 7:
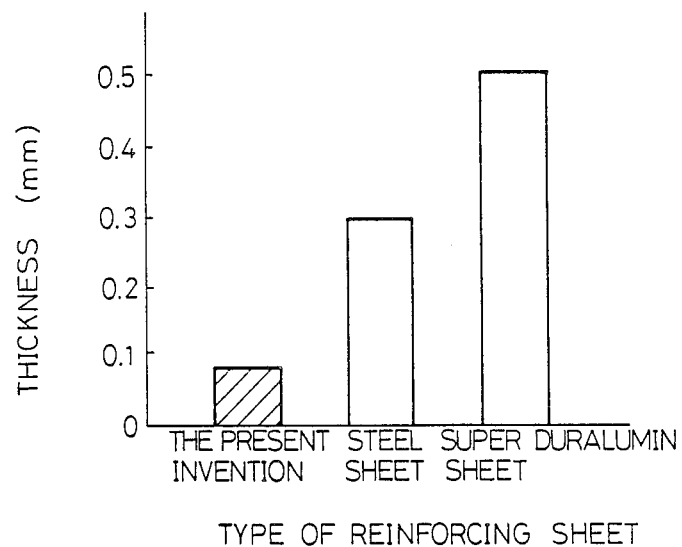
FIG. 7 shows thicknesses of the sheet of the present invention, the steel sheet, and the super Duralumin sheet shown in FIG. 6.

Referring to FIG. 7, the resultant filament-reinforced polymer material sheet of the present invention had a remarkably smaller thickness than that of the conventional steel sheet-reinforced polymer material sheet and of the conventional super Duralumin sheet-reinforced polymer material sheet.

COMPARATIVE EXAMPLES 1 TO 5

In each of Comparative Examples 1 to 5, the same procedures as those described in Example 1 were carried out except that the specific filament-reinforcing sheet of the present invention was replaced by a woven fabric in Comparative Example 1, by a multifilament yarn sheet in Comparative Example 2, by a nonwoven fabric A in Comparative Example 3, by a nonwoven fabric B in Comparative Example 4, and by a nonwoven fabric C in Comparative Example 5, and a crimping machines was not used.

The woven fabric in Comparative Example 1 was a plain weave consisting of wholly aromatic polyamide multifilament yarns (1000 denier/66 filaments) and having a weight of 283 g/m$^2$ and the following structure:

31 yarns/25.4 mm $\times$ 31 yarns/25.4 mm.

The multifilament yarn sheet used in Comparative Example 2 consisted of wholly aromatic polyamide multifilament yarns (1500 denier/1000 filaments) arranged in parallel to each other at a density of 31 yarns/25.4 mm and had a weight of 142 g/m$^2$.

The nonwoven fabric A used in Comparative Example 3 was made by a spun bond method, consisted of polyester fibers (2 denier), and had a weight of 110 g/m$^2$.

The nonwoven fabric B used in Comparative Example 4 was made by a conventional wet sheet-forming method, consisted of polyester fibers (2 denier), and had a weight of 190 g/m$^2$.

The nonwoven fabric C used in Comparative Example 5 was made by a continuous multifilament-opening method, consisted of polyester multifilaments (2 denier), and had a weight of 170 g/m$^2$.

The properties of the resultant sheets are shown in Table 2 in comparison with the properties of the resultant sheet of Example 1.

TABLE 2

| Example No. | Tensile strength (kg/mm$^2$) | Thickness (mm) | CV (%) | Durability |
|---|---|---|---|---|
| Example 1 | 127 | 0.08 | 6 | Good |
| Comparative Example 1 | 65 | 0.48 | 35 | Good |
| Comparative Example 2 | 119 | 0.40 | 59 | (*) |
| Comparative Example 3 | 13 | 0.60 | 32 | Good |
| Comparative Example 4 | 11 | 0.31 | 30 | Good |
| Comparative Example 5 | 15 | 0.55 | 32 | Good |

Note:
*-The resultant sheet was easily split in the longitudinal direction of the multifilament yarns and thus was useless in practice.

In the resultant multifilament yarn-reinforced polymer material sheet of Comparative Example 2, the individual filaments in the yarn were in contact with each other, and thus penetration of the polymer material between the individual filaments was very difficult. Therefore, the individual filaments in the yarns were not satisfactorily bonded to each other by the polymer material and the resultant sheet was easily split in the longitudinal direction of the yarns.

Also, the resultant polymer material sheets of Comparative Examples 1 to 5 had a very large thickness and a very high CV, in comparison with those of Example 1.

We claim:

1. A synthetic filament-reinforced polymer material sheet having a thickness of 0.25 mm or less and a specific tensile strength of $3.4 \times 10^6$ cm or more, and comprising:

a reinforcing sheet comprising a number of individual synthetic polymer filaments straightened and arranged substantially in parallel to each other and spaced from each other at an average interval equal to or smaller than the average thickness of the individual filaments, and having a width W and a thickness T thereof satisfying the relationship:

$$W/T \geq 40$$

and a coefficient of variation in the thickness thereof of 30% or less; and a polymer material impregnated in the reinforcing sheet to fill the spaces among the individual filaments.

2. The sheet as claimed in claim 1, wherein the individual filaments comprise a synthetic polymer selected from wholly aromatic polyamides, modified polymers of the above-mentioned polyamides, wholly aromatic polyesters, and polyethylenes.

3. The sheet as claimed in claim 2, wherein the individual filaments comprise a poly-p-phenylene terephthalamide or a modified polymer thereof.

4. The sheet as claimed in claim 1, 2, or 3, wherein the individual filaments have a degree of orientation of 90% or more and a degree of crystallization of 65% or more.

5. The sheet as claimed in claim 1, wherein the polymer material comprises at least one member selected from epoxy resins, phenolic compound-formaldehyde resins, unsaturated polyester resins, diallylphthalate resins, bis-maleimide resins, triazine resins, silicone resins, polybutylene terephthalate resins, saturated polyester resins, polyacetal resins, polycarbonate resins, aliphatic polyamide (nylon) resins, modified polyphenyleneoxide resins, polysulfon resins, polyethersulfon resins, polyphenylenesulfide resins, polyallylate resins, polyamideimide resins, polyetherimide resins, polyetherketone resins, polyimide resins, polyoxybenzoate resins, and fluorine-containing polymer resins.

6. The sheet as claimed in claim 1, wherein the reinforcing sheet and the polymer material are in a weight ratio of from 70:30 to 20:80.

7. The sheet as claimed in claim 1, wherein the individual filaments have a denier of 0.8 to 6.

* * * * *